US010959576B2

(12) United States Patent
Kaufmann (10) Patent No.: US 10,959,576 B2
(45) Date of Patent: Mar. 30, 2021

(54) DEVICE WITH WIRELESS MODULE FOR PROCESSING A MEDIUM (71) Applicant: IKA-Werke GmbH & CO. KG, Staufen (DE)

(72) Inventor: Axel Kaufmann, Neuenburg (DE)

(73) Assignee: IKA-Werke GmbH & CO. KG, Staufen (DE)

( * ) Notice: Subject to any disclaimer, the term of this patent is extended or adjusted under 35 U.S.C. 154(b) by 223 days.

(21) Appl. No.: 15/738,387

(22) PCT Filed: Jun. 20, 2016

(86) PCT No.: PCT/EP2016/001045
§ 371 (c)(1),
(2) Date: Dec. 20, 2017

(87) PCT Pub. No.: WO2017/001049
PCT Pub. Date: Jan. 5, 2017

(65) Prior Publication Data
US 2018/0184847 A1    Jul. 5, 2018

(30) Foreign Application Priority Data
Jul. 2, 2015  (DE) .................. 10 2015 008 412

(51) Int. Cl.
*A47J 43/046*   (2006.01)
*B01F 15/00*   (2006.01)
(Continued)

(52) U.S. Cl.
CPC ............. *A47J 43/046* (2013.01); *B01F 7/162* (2013.01); *B01F 15/0022* (2013.01);
(Continued)

(58) Field of Classification Search
CPC ........ A47J 43/046; B02C 25/00; B01F 7/162; B01F 15/00162; B01F 15/00175;
(Continued)

(56) References Cited

U.S. PATENT DOCUMENTS 6,571,564 B2 *   6/2003   Upadhye ............. A47J 36/2438
                                                  165/80.5
9,049,967 B1 *   6/2015   Golino .................. A47J 43/085
(Continued)

FOREIGN PATENT DOCUMENTS

CN        104688011 A   *   6/2015
DE        19947466 A1       5/2001
(Continued)

OTHER PUBLICATIONS

English translate (DE202005016300U1), retrieved date Oct. 8, 2019.*
(Continued)

*Primary Examiner* — Adam J Eiseman
*Assistant Examiner* — Mohammed S. Alawadi
(74) *Attorney, Agent, or Firm* — Budzyn IP Law, LLC (57) ABSTRACT The invention relates to a device (1) having a base station (2) and at least one processing unit (3) that can be detached from the base station (2), having a tool (4) for processing a medium, wherein the processing unit (3) is provided with a vessel (5) for receiving the medium, a closure unit (6) for closing the vessel (5) and a sensor device (13) for measuring at least one parameter of the medium, wherein the sensor device (13) is disposed in and/or on the vessel (5) in a stationary manner such that a reliable measurement of a parameter can be carried out simultaneously with processing of the medium, and in that the device (1) has a wireless (Continued)

module (7) for producing a wireless connection between the base station (2) and the processing unit (3) at least for transmitting data.

20 Claims, 5 Drawing Sheets (51) Int. Cl.
*B02C 25/00* (2006.01)
*B01F 7/16* (2006.01)
*H04Q 9/00* (2006.01)
*H04B 5/00* (2006.01)
*H04W 76/10* (2018.01)

(52) U.S. Cl.
CPC .... *B01F 15/0024* (2013.01); *B01F 15/00162* (2013.01); *B01F 15/00175* (2013.01); *B01F 15/00305* (2013.01); *B01F 15/00896* (2013.01); *B02C 25/00* (2013.01); *H04Q 9/00* (2013.01); *H04B 5/0056* (2013.01); *H04Q 2209/47* (2013.01); *H04W 76/10* (2018.02)

(58) Field of Classification Search
CPC ............ B01F 15/00305; B01F 15/0022; B01F 15/0024; B01F 15/00896; H04Q 9/00; H04Q 2209/47; H04W 76/10; H04B 5/0056
USPC ...................................................... 241/101.2
See application file for complete search history.

(56) References Cited

U.S. PATENT DOCUMENTS

| | | | | |
|---|---|---|---|---|
| 2011/0148582 | A1* | 6/2011 | Ritamaki | E05B 39/02 340/10.1 |
| 2013/0192477 | A1* | 8/2013 | Hoare | A47J 36/32 99/486 |
| 2013/0305933 | A1 | 11/2013 | Heidrich et al. | |
| 2016/0296899 | A1* | 10/2016 | Hoare | B01F 15/00389 |
| 2016/0309960 | A1* | 10/2016 | Kolar | A47J 43/0761 |
| 2016/0328637 | A1* | 11/2016 | Viikari | G06K 19/0723 |
| 2017/0224169 | A1* | 8/2017 | Kolar | A47J 43/0727 |

FOREIGN PATENT DOCUMENTS

| | | | |
|---|---|---|---|
| DE | 202005016300 | * | 12/2005 |
| DE | 202005016300 U1 | | 12/2005 |
| DE | 102010055511 B4 | | 10/2014 |
| WO | 2014144638 A1 | | 9/2014 |

OTHER PUBLICATIONS

English translate (CN104688011A), retrieved date Oct. 9, 2019.*
Ask The Experts Forum—RFID Journal, retrieved date Mar. 20, 2020.*
Transponder, retrieved date Mar. 20, 2020.*
International Search report for corresponding PCT Application No. PCT/EP2016/001045 dated Sep. 13, 2016.

* cited by examiner

DEVICE WITH WIRELESS MODULE FOR PROCESSING A MEDIUM

The invention relates to a device having a base station and at least one processing unit that can be detached from the base station, having a tool for processing a medium, wherein the processing unit is provided with a vessel for receiving the medium, a closure unit for closing the vessel and a sensor device for measuring at least one parameter of the medium.

Devices of the type mentioned above are already known in a variety of embodiments. In known devices of this type, it may be desirable to carry out a measurement of a specific parameter of the medium, in particular during start-up of the tool of the processing unit that, for example, acts to comminute, grind or mix a medium. In this regard, as a rule, a sensor device such as a measuring probe of a thermometer, for example, is inserted into an internal space of the vessel of the processing unit. During operation of such a device, the danger then arises that a sensor device that is retained or suspended in particular in the vessel could become damaged by the moving or rotating tool and/or by the tool itself if the tool collides with the sensor device.

A further substantial problem arises because known devices of the type mentioned above are not generally suitable for carrying out a measurement of a specific parameter in real time so that they are capable of reacting immediately to a change in the measured parameter, for example so as to stop the drive to the tool. This may be of major importance particularly when the medium is sensitive to processing, when specific limits to the parameters to be measured must not be overshot or undershot because if so, the medium might be damaged.

Normally, known devices of the aforementioned type consist of a base station and only a single processing unit, wherein the detachable processing unit includes just one quite specific and, as a rule, non-interchangeable tool for processing a medium. The processing unit is therefore sometimes only configured so as to be detachable in order to allow for easier handling, for example easier decanting of the medium in the vessel that has been processed. A combination or an operation of the base station with a plurality of interchangeable processing units is usually not envisaged. Thus, the user of such a device is constrained to use just one tool with one processing unit. In addition, the situation may arise whereby a user operates a processing unit for too long and exceeds a maximum operating time. As an example, by being operated for too long, the tool could be worn down or, in particular, dull.

Moreover, devices are also known which have interchangeable processing units, in particular with different tools and which can be operated together with one base station. A substantial disadvantage with equipment of this known type, however, is that the base station cannot identify whether and/or which type of processing unit has been placed on the base station so that the latter can operate it. As a rule, because processing programs for processing the medium have to be manually adjusted and/or the usual base stations on known devices do not have any specific power limitations for the respective processing unit, the consequence may be that the processing unit, in particular the tool, is used inappropriately, for example by employing too high a rotational speed and/or by being operated for too long. This may have the result that the processing unit, in particular the tool of the processing unit and/or the medium to be processed, become/becomes damaged. Until now, attempts to solve this problem have occasionally been technically complicated and expensive.

The fundamental objective of this invention therefore consists of providing a device of the type mentioned at the outset which does not suffer from the aforementioned disadvantages.

This objective is achieved by means of the features of claim 1. In particular, the objective is achieved in accordance with the invention in that a portion of the sensor device, or the sensor device, is disposed in and/or on the vessel in a stationary manner such that a measurement, in particular a reliable measurement, of a parameter can be carried out simultaneously with processing of the medium, and in that the device has a wireless module for producing a wireless connection and at least for transmitting data between the base station and the processing unit. In particular, the wireless connection may be provided at least for transmission of a measured parameter. The possibility of carrying out a reliable measurement simultaneously with processing of the medium using the tool arises because while the tool is moving or rotating, it is possible to measure a parameter of the medium at the same time, but it is ensured that there is no risk of the sensor device colliding with the tool because they are disposed so as to be sufficiently spatially separated from each other. This means that it is impossible for the tool and the sensor device to come into contact. Furthermore, at least a portion of the sensor device, in particular a sensor element, may occlude the inside of the vessel wall, in particular flush mounted, preferably so that it does not protrude into the internal space of the vessel. This is made possible because the sensor device is disposed on and/or in the vessel of the device in accordance with the invention in a manner such that at least a portion thereof, in particular a sensor element, preferably a sensor element formed as a sensor pin, is integrated into the wall of the vessel and/or in the internal space of the vessel. The wireless connection that can be produced by the wireless module allows data to be transferred wirelessly between the base station and the processing unit by radio. This means that electrical lines and/or electrical contacts between the processing unit and the base station can be completely dispensed with.

Furthermore, the sensor device may be provided with a sensor element or a plurality of sensor elements. The at least one sensor element may in particular be configured as a sensor pin. Furthermore, in the case in which a plurality of sensor elements are provided, different sensor elements may be provided which are suitable for measuring different parameters such as, for example, a temperature, a pressure, a pH value and/or a moisture content.

In a particularly advantageous embodiment of the invention, the wireless module of the device in accordance with the invention may consist of a transponder unit and a receiving unit, wherein an electronic coupling can be established between the transponder unit and the receiving unit at least for transmitting data. Preferably, the electronic coupling can be set up in order to send data from the receiving unit to the transponder unit and/or in order to receive data sent from the transponder unit via the receiving unit, or vice versa. Alternatively to or as a supplement to the features of the device in accordance with the invention defined above, the electronic coupling may be established to supply energy for the transponder unit in particular by means of radio waves from the receiving unit.

In particular, the data may be transmitted in the radio frequency range. Furthermore, a data transmission via Bluetooth, WLAN, ZigBee, NFC, Wibree or WiMAX in the radio frequency range as well as IrDA and free space optical communication (FSO) in the infrared and/or optical frequency range may be envisaged. The term "transponder unit" refers to a radio communications unit which receives incoming signals and responds and/or relays it, in particular automatically. This may include both passive as well as active transponder units. The term "passive" in this regard refers to systems that draw the energy required for communication and processing internal processes exclusively from the field from a receiving unit, in particular a read/write unit. Passive transponders do not require their own power supply. The term "active" in this regard refers to systems with their own energy supply. As an example, they may have a battery or an accumulator and/or may be connected to an external power supply. In addition to the pure forms of passive or active systems, semi-active transponders also exist. The term "transponder unit" may refer to all of the radio systems described herein, although this list is not exhaustive.

In addition, the transponder unit of the device in accordance with the invention may comprise a memory and/or an antenna for sending and/or receiving data. The memory may, for example, serve to store measured parameters and/or to store a specific coding as an identification signal, in particular for a processing unit. Furthermore, the time during which the processing unit has already been operating may be stored, preferably automatically. Preferably, the transponder unit is at least partially in chip form, coin form, disk form, ball form, cube form, or is spherical and/or rectangular in configuration. Furthermore, the widest diameter of the transponder unit may be a maximum of 10.0 cm, in particular a maximum of 5.0 cm, in particular a maximum of 2.5 cm, in particular less than 2.5 cm. Furthermore, the widest diameter of the transponder unit may be less than 10.0 mm, in particular less than 5.0 mm. Moreover, it may be advantageous for the narrowest diameter of the transponder unit to be less than 5.0 mm, in particular less than 2.5 mm, in particular less than 1.0 mm. The transponder unit may also be provided with a transponder housing, wherein the transponder housing may, for example, consist of plastic and/or glass.

In a further advantageous embodiment of the device in accordance with the invention, the processing unit may be provided with a transponder unit and the base station may be provided with a receiving unit. Similarly, alternatively or as a supplement, the base station may be provided with a transponder unit and the processing unit may be provided with a receiving unit. This means that data, in particular measured parameters, can be transmitted between the processing unit and the base station. The base station may also be configured to evaluate the received data and to start a specific processing program, in particular automatically, as a reaction to the evaluated data.

A or the transponder unit mentioned above may be disposed on an outer side of the vessel wall. In particular, it may be advantageous for the transponder unit to be disposed facing the base station when the processing unit is in the operating position and/or to be disposed on a or the outer side of a vessel bottom of the vessel. Alternatively or as a supplement to the features defined above, in the device in accordance with the invention, a or the aforementioned receiving unit may be disposed on a base of the base station for positioning and/or engagement of the processing unit on the base station, in particular in an aperture on the top of the base. Furthermore, the aperture may be closed to the outside with a cover, in particular a plastic cover. One or more of the configuration types mentioned above for the transponder unit and/or the receiving unit mean that it is possible for a distance between the transponder unit and the receiving unit to be relatively small, in particular less than 15.0 cm, in particular less than 10.0 cm, in particular less than 7.5 cm, in particular less than 5.0 cm, in particular less than 2.5 cm. Particularly in the case of passive transponder units, a shorter distance may be advantageous because the range of the transponder unit for establishing a wireless connection may then be shorter.

Yet more advantageously, the sensor device of the device in accordance with the invention is connected to at least a portion of the wireless module, in particular to a or the aforementioned transponder unit. In particular, they may be connected together electrically. Alternatively or as a supplement to the aforementioned features, the sensor device of the device in accordance with the invention may be formed as one piece together with at least a portion of the wireless module, in particular with a or the aforementioned transponder unit in order to form a transponder-sensor unit. In addition, alternatively or as a supplement to the aforementioned features, at least a portion of the sensor device, in particular a sensor element, preferably a sensor element configured as a sensor pin, can come into contact with the medium in the internal space of the vessel. Preferably in this regard, at least a portion of the sensor device, in particular a sensor element, preferably a sensor element configured as a sensor pin, passes through an opening in a vessel wall of the vessel, in particular in a vessel bottom, and thereby extends to or into an internal space of the vessel, in particular in and/or at a vessel bottom and/or adjoins it. In particular, at least a portion of the sensor element, in particular the portion that comes into contact with the medium, is flush mounted with an inside wall of the vessel, in particular with the vessel bottom.

In order to protect the electronics of the wireless module better, in particular of the transponder unit which could possibly be pressure- and/or heat-sensitive, in the device in accordance with the invention, at least a portion of the wireless module, in particular a or the transponder unit, is preferably thermally insulated from at least a portion of the sensor device, in particular thermally insulated from a or the sensor element. This may then in particular be advantageous when the sensor device has to determine the temperature, in particular high temperatures, which could damage the transponder unit.

Furthermore, as an alternative or as a supplement to the features defined above, it may be advantageous for at least a portion of the wireless module, in particular a or the transponder unit, to be insulated from the vessel wall, preferably thermally insulated. Preferably, the transponder unit may be insulated, preferably thermally insulated, by enclosing it in a layer of plastic.

In order to allow the processing unit of the device in accordance with the invention to be cleaned and/or disinfected properly, the processing unit may be designed so as to be capable of being autoclaved and/or to be dishwasher safe. Furthermore, it may be advantageous for at least a portion of the sensor device, in particular the portion which is in contact with the medium, preferably at least a portion of a or the sensor element, to be coated in order to prevent damage to the sensor device, in particular the sensor element, for example by chemical cleaning agents.

In a particularly advantageous embodiment of the device in accordance with the invention, the device may be provided with a plurality of processing units, which in particular are functionally different, preferably comprising different tools. As an example, one or more processing units of the device in accordance with the invention may be configured as a blender, grinder, mixing unit, in particular a stirring unit or kneading unit. Preferably, one or more processing units of the device in accordance with the invention may be configured as a blender and/or one or more processing units may be configured as a grinder. Furthermore, as an alternative or as a supplement, it may be advantageous for the base station to be provided with a drive, in particular to drive the tool of the at least one processing unit.

As an example, in order to allow identification of the or a specific processing unit by the base station, the or each processing unit belonging to the device, by means of a coding, in particular a specific coding, in particular stored on a or the aforementioned transponder unit, may be assigned a specific identification signal so that the base station can identify the respective processing unit. Ideally, a specific coding may be stored on a data carrier of the transponder unit.

Particularly advantageously, the device in accordance with the invention may be provided with a storage device. Preferably, the base station of the device in accordance with the invention is provided with a storage device, in particular wherein the base station comprises a program memory having a plurality of processing programs, in particular assigned to each of the plurality of and/or to different processing units. Alternatively or as a supplement, it may be advantageous for the base station to be configured in a manner such that, by means of the identification signal, a specific approved processing program, in particular for the or a specific processing unit, can be selected from a or the program memory for a or the processing unit, preferably automatically. In particular, by means of a specific processing program, a specific processing time and/or a specific processing intensity, in particular for processing the medium, can be selected or defined. Furthermore, it may be advantageous if a maximum operating time for the processing unit can be ascertained and/or stored by means of the transponder unit. This makes it possible for a maximum operating period to be defined for the or each processing unit, preferably wherein reaching this maximum operating time can be detected by the base station, in particular automatically. As an example, this may be displayed to the user on a display unit of the device in accordance with the invention, so that the user is warned that the processing unit has to be changed and/or must be repaired. In this manner, for example, processing of a medium with a processing unit that has already reached its maximum processing time can be avoided; the device in accordance with the invention and/or the medium might otherwise be damaged.

In a particularly advantageous embodiment of the device in accordance with the invention, a or the transponder unit may be configured as an RFID transponder, in particular with a memory and an antenna for transmitting and/or receiving data. In this case, it is also advantageous when a or the receiving unit is set up as an RFID receiving unit, in particular as an RFID read device or as an RFID read/write device. The particular advantage of RFID technology is that components in the form of an RFID transponder unit and RFID receiving unit are relatively small and thus can readily be integrated into larger components such as the processing unit and/or the base station, for example. Furthermore, they are cheap to produce. In particular, the RFID transponder unit and/or the RFID receiving unit may be configured in the form of chips. "RFID" is the abbreviation for "Radio Frequency Identification".

It may be advantageous for the sensor device to be provided with one or more sensors selected from the group consisting of temperature sensor (thermometer), pH sensor, moisture sensor and/or pressure sensor. In particular, the sensor device may be configured as a temperature sensor with a sensor element, in particular a sensor pin.

Several embodiments of the invention will be described below in more detail with the aid of the accompanying drawings which, alone or in combination with the claims and the description, can provide further embodiments of the invention. In schematic form:

Figure 1:
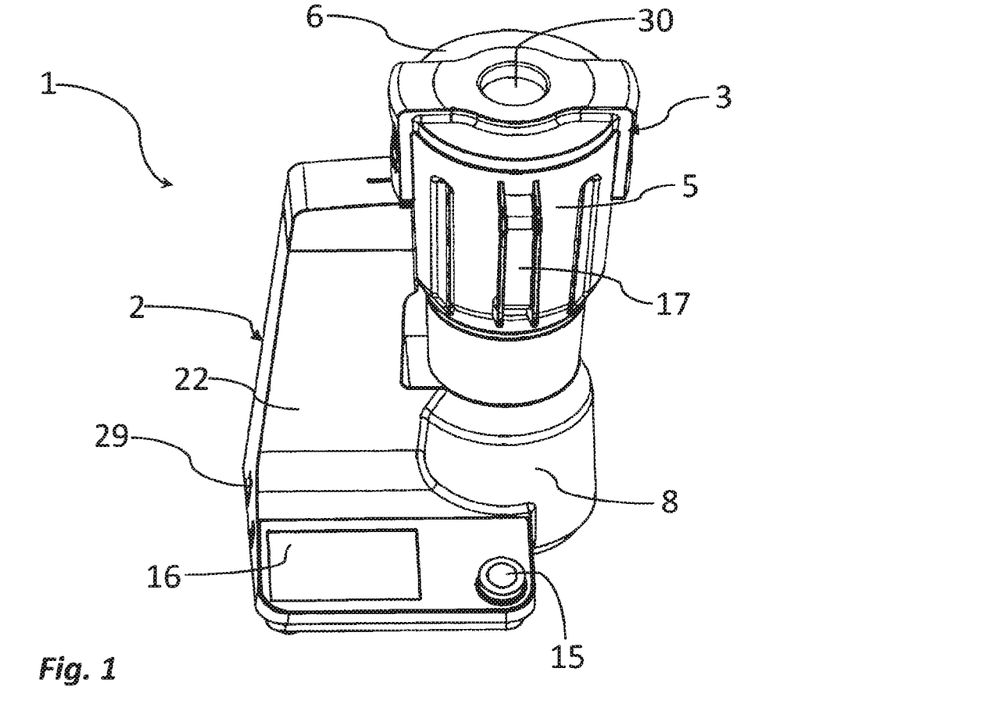
FIG. 1 shows a perspective view of an exemplary embodiment of a device in accordance with the invention, with a processing unit in the form of a blender unit.
Figure 2:
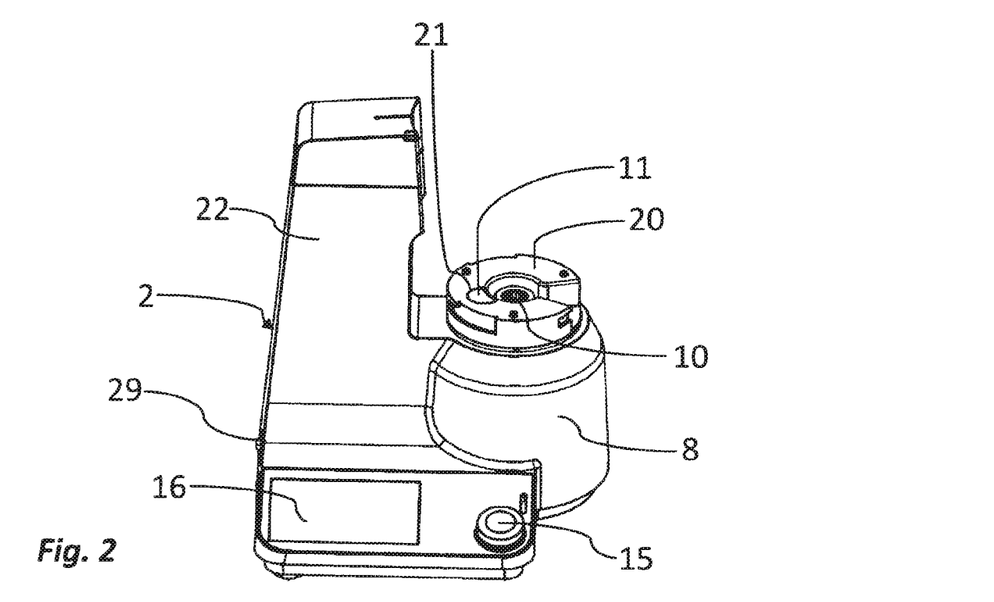
FIG. 2 shows a perspective view of a base station of the device in accordance with the invention as shown in FIG. 1.
Figure 3:
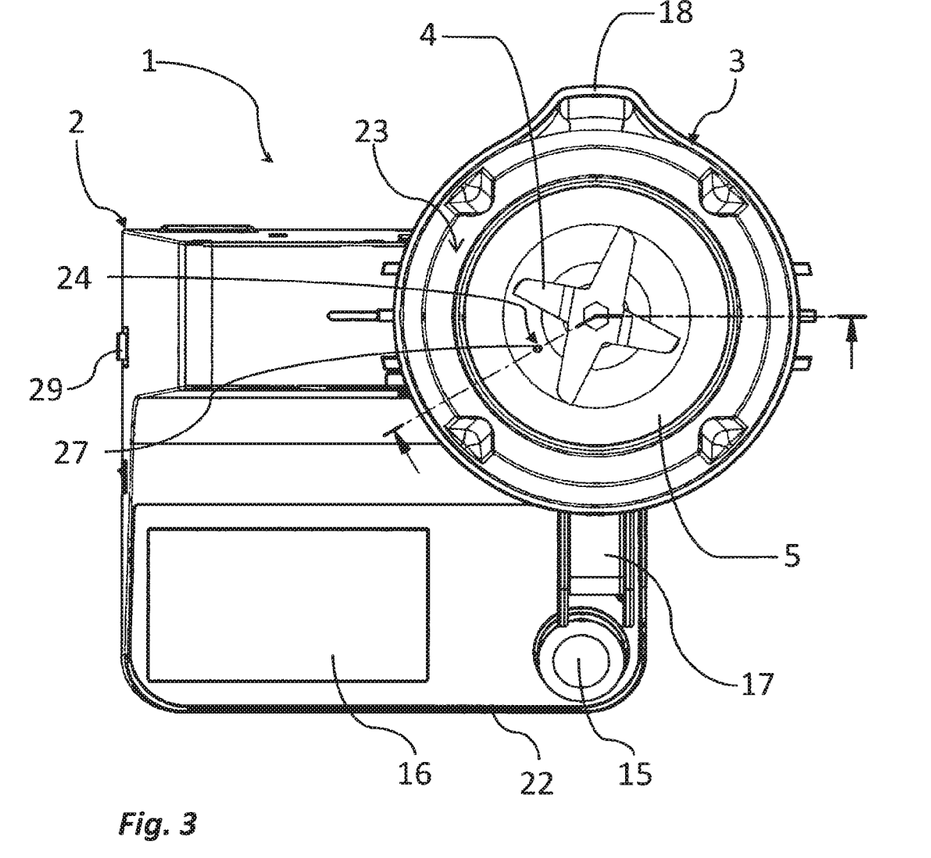
FIG. 3 shows a top view of an exemplary embodiment of a device in accordance with the invention with a processing unit in the form of a blender unit as shown in FIG. 1.
Figure 4:
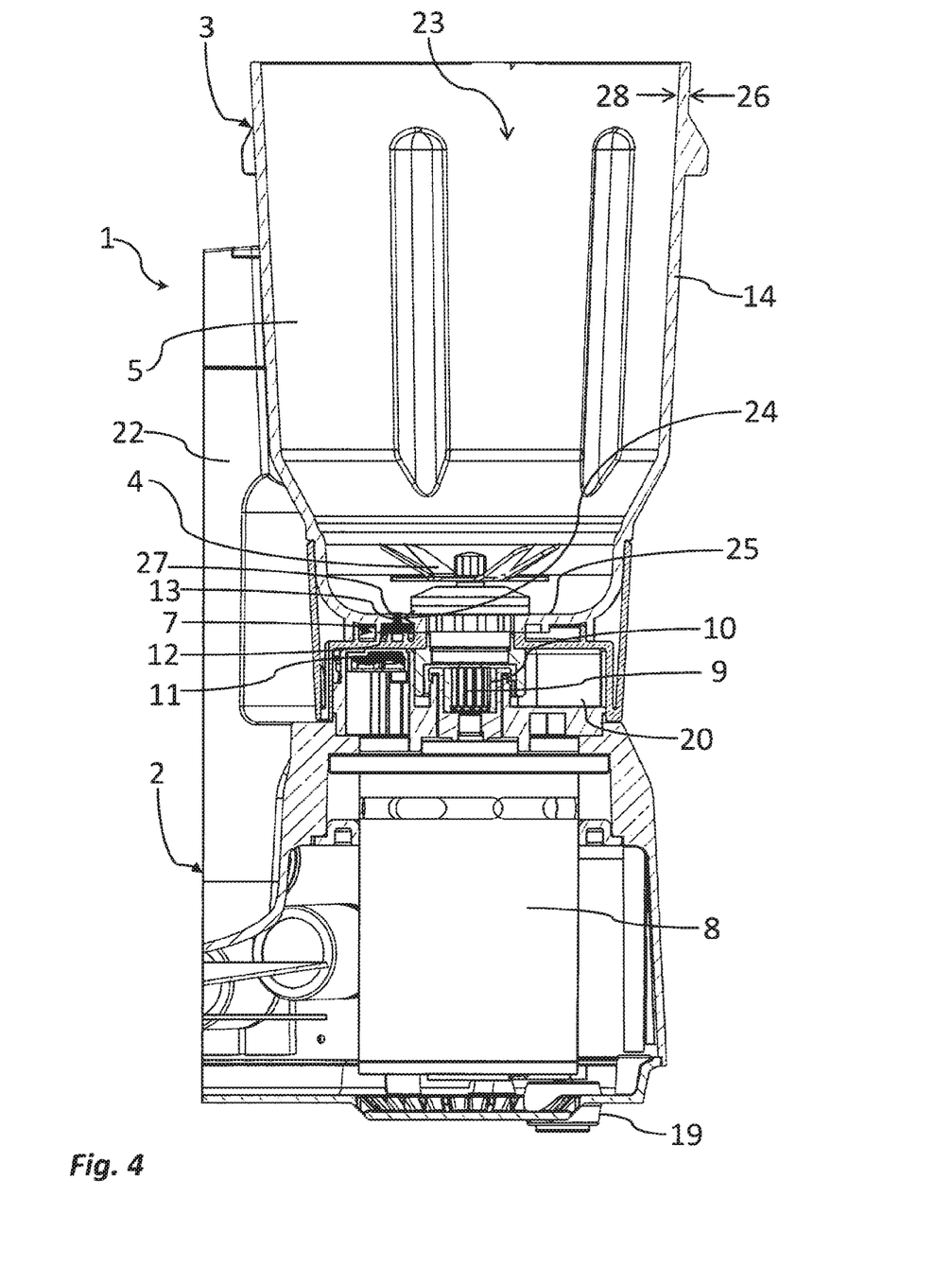
FIG. 4 shows a section of a device in accordance with the invention as shown in FIGS. 1 to 3 in side view and part-sectional view.

FIGS. 1, 3 and 4 show an embodiment of a device in accordance with the invention which will henceforth be generally referred to as 1. FIG. 2 shows a base station 2 of the device 1 in accordance with the invention without a processing unit 3, which has been detached. The detached processing unit 3 is only partly shown in sections in FIGS. 5 and 6.

The device 1 has a base station 2, on which a detachable processing unit 3 can be placed and can be operated in the operating position by means of a drive 8 of the base station 2.

Figure 7:
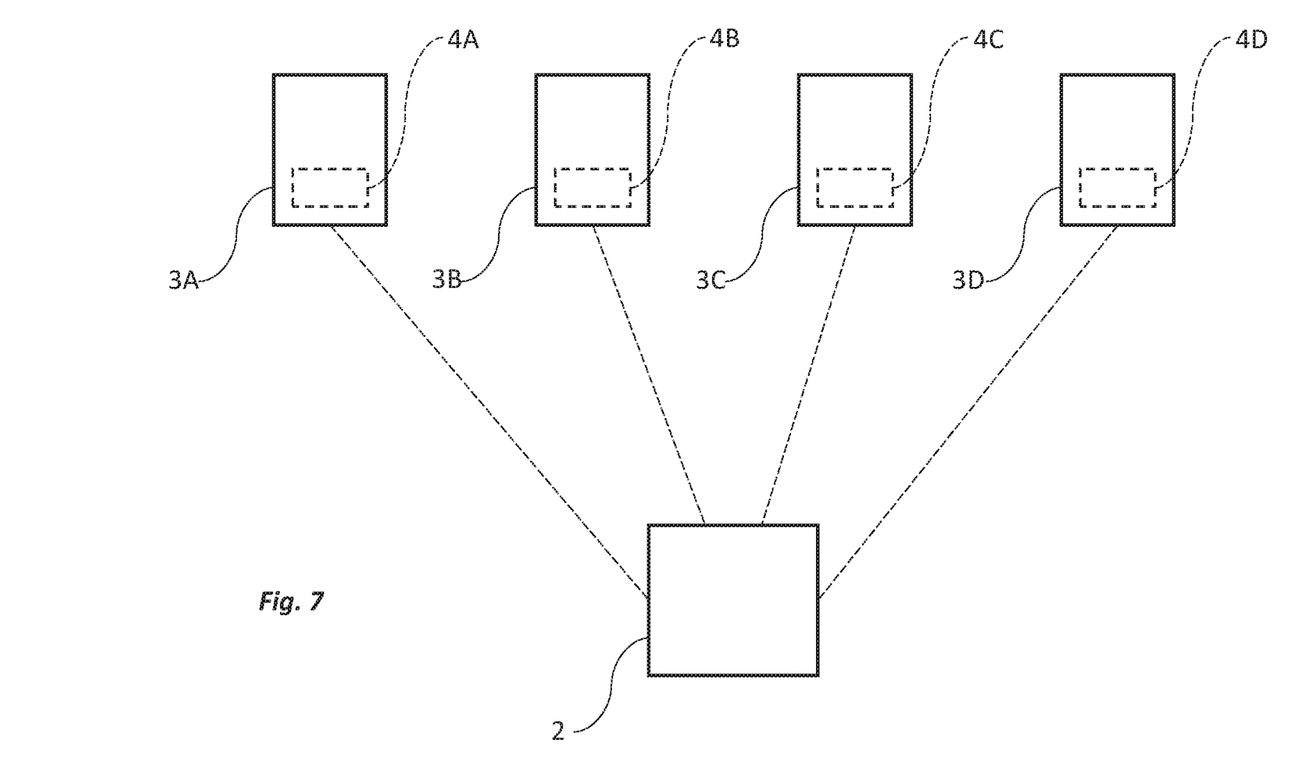
FIG. 7 shows a plurality of processing units for combination with a base station in accordance with the invention.

The processing unit 3 is provided with a vessel 5 and a closure unit 6 to close the vessel 5; as can be seen here in FIG. 1, the closure unit 6 may be provided with a filling opening 30 for filling with a medium. Disposed in the internal space 23 of the vessel 5 is a tool 4 for processing a medium, wherein in the operating position, i.e. when the processing unit 3 has been placed on the base station 2, the tool 4 can be driven by the drive 8, in particular driven in rotation. In the device 1 shown in the figures, the processing unit 3 is configured as a blender unit, wherein the tool 4 can be rotated and is formed with four rotary knives in a star-shaped disposition. However, it is also possible to envisage using the base station 2 to start up other embodiments of a processing unit 3. In particular, e.g., as shown in FIG. 7, other processing units 3 (3A, 3B, 3C, 3D, . . . ) that can be combined individually with the base station 2 can be fitted with other tools 4 (4A, 4B, 4C, 4D, . . . ). The tool 4 may, for example, be configured as a knife, mortar, stirring element, kneading hook, whisk, flat stirrer, grater, grinding element or the like.

The device 1 further comprises a sensor device 13 by means of which at least one parameter of a medium in the vessel 5 can be measured in real time and during the operation of the device, i.e. while the tool 4 is moving. As can be seen in FIG. 4 in particular, the sensor device 13 is integrated in the vessel in a stationary manner so that a reliable measurement of a parameter can be carried out simultaneously with processing of the medium, because the tool and the sensor device are disposed in a manner such that it is impossible for the tool and the sensor device to come into contact, and so there is no risk that the sensor device could collide with the tool.

The sensor device 13 may be configured as a temperature sensor, pH sensor, moisture sensor and/or pressure sensor, in particular with at least one sensor element 27. The sensor device 13 shown here is configured as a temperature sensor with a sensor element 27, which preferably extends into the internal space 23 of the vessel 5. In particular, the sensor device 13 comprises a sensor element 27 configured as a sensor pin, which comes into contact with a medium in the internal space 23 of the vessel. In this regard, it may be advantageous for the sensor element 27 to have a low mass and/or to have a low specific heat capacity, so that a change in the temperature of the medium may be measured substantially in real time, i.e. immediately upon the onset of the change in temperature. The sensor element 27 may be disposed in an opening 24 of the vessel wall 14, in particular in the vessel bottom 25 of the vessel 5, and/or pass through it. In particular, it may be advantageous for the portion of the sensor element 27 that extends into the internal space 23 of the vessel 5 to be flush mounted with the inside 28 of the vessel wall 14. In order to protect the sensor element 27, in particular the portion that extends into the internal space 23 of the vessel and/or that comes into contact with the medium, from external influences such as chemical cleaning agents, from pressure and/or from heat, for example, the sensor element 23, in particular at least the portion that extends into the internal space 23 of the vessel and/or that comes into contact with the medium, preferably the measuring rod, may be coated and/or sealed.

A wireless module 7 is provided in order to produce a wireless connection for receiving and/or transmitting data between the base station 2 and the processing unit 3. By means of the wireless module 7, it may therefore be possible to transmit data from the base station 2 to the processing station 3 and/or from the processing station 3 to the base station 2, in particular automatically.

Figure 5:
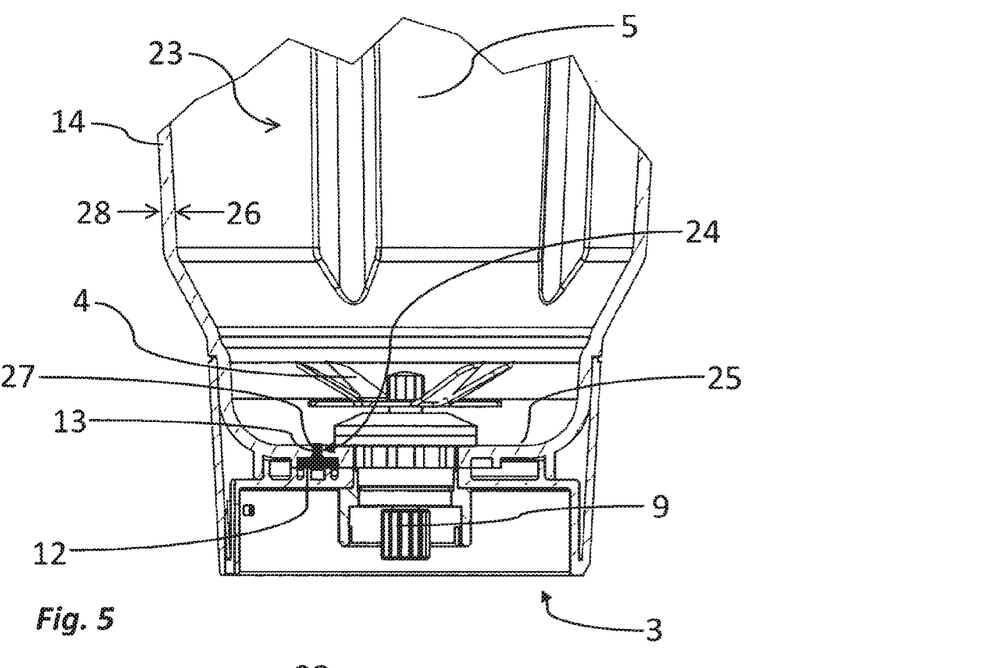
FIG. 5 shows a section of a lower region of a processing unit shown in side view and in part-sectional view, wherein the processing unit is in the form of a blender unit.
Figure 6:
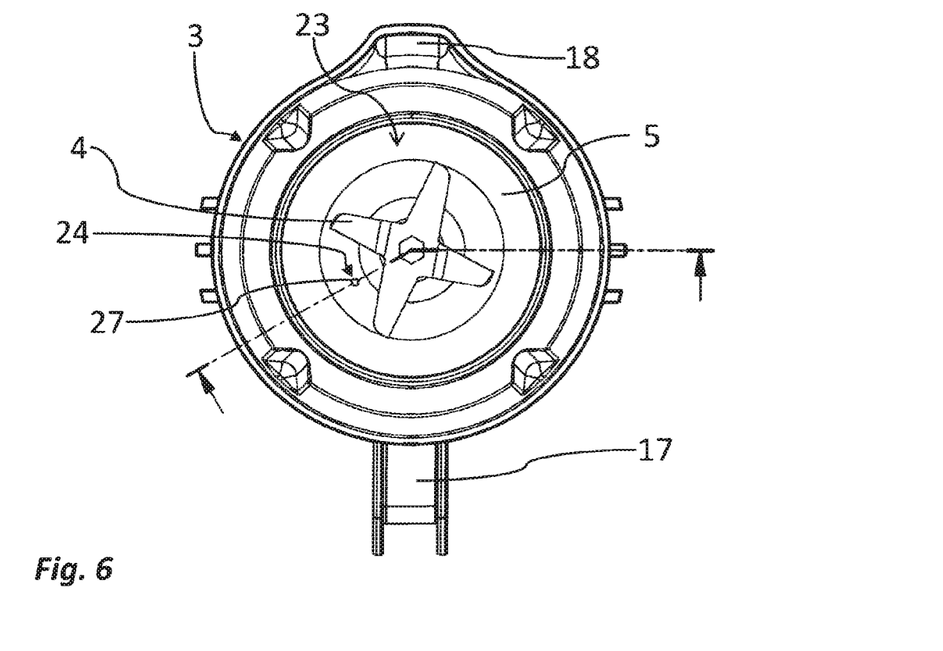
FIG. 6 shows a top view of a processing unit of the device in accordance with the invention as shown in FIGS. 1 to 5.

As can be seen in FIG. 4 and partially in FIG. 5 (relating to the processing unit 3), the wireless module 7 is provided with a transponder unit 12 and a receiving unit 11.

The transponder unit 12 herein is integrated into the processing unit 3, wherein it is disposed on the outside 26 of the vessel wall 14 at the vessel bottom 25. The transponder unit 12 may be covered and protected from the outside by a housing.

The receiving unit 11 is disposed on the base station 2 or integrated into the base station 2, in particular wherein it is disposed in an aperture 21 of a base 20, preferably on the top of a base 20 of the base station 2 for placement and/or engagement of the processing unit 3 on the base station 2. The processing unit 3 has a coupling element 9 which can be placed in a suitable mating coupling element 10 of the base 20. The mating coupling element 10 is configured to accommodate the coupling element 9 and may, for example, be connected to the drive 8 via a drive shaft. In the operating position of the processing unit 3, the tool 4 may thus be driven by means of the transmission of power from the mating coupling element 10 to the coupling element 9 by starting up the drive 8. The base 20 may be produced from a metal, for example. Preferably, the base 20 is provided with an opening in which the mating coupling element 10 is disposed.

An electronic coupling may be established between the transponder unit 12 and the receiving unit 11, at least for the production of a wireless connection for the transmission of data, in particular for sending and/or receiving data from the receiving unit 11 to the transponder unit 12 or vice versa. Moreover, the energy supply for the transponder unit 12 may be provided by radio waves from the receiving unit.

In the embodiment of the device 1 in accordance with the invention shown in the figures, the transponder unit 12 is configured as an RFID transponder, in particular in the form of a chip (RFID="Radio Frequency Identification"; also termed an RFID transponder chip) with a memory and an antenna for sending and/or receiving data. The receiving unit 11 is configured as an RFID receiving unit, in particular as an RFID reader device or as an RFID read/write device. The RFID transponder may be configured as a passive transponder unit 12 and thus does not require its own power supply. The RFID transponder may equally be configured as an active transponder unit 12 and be provided with its own power supply. Because of the small dimensions of the transponder unit 12, in particular when it is passive in configuration, and of the receiving unit 11, these components can be disposed, in particular integrated, in a space-saving manner, on or in the processing unit 12 and/or on or in the receiving unit 11. Furthermore, by means of the receiving unit 11 and the transponder unit 11, a wireless connection can be produced without these two components having to come into direct contact with each other.

The transponder unit 12 is connected to the sensor device 13 or is configured together in one piece so that parameters of the medium measured by the sensor device 13 can be transmitted directly to the transponder unit. To protect its electronics, in particular from the influence of heat, the transponder unit 12 may be insulated, preferably thermally, from the sensor device 13, in particular from the sensor element 27. This may, for example, be carried out by encasing the transponder unit 12 in a plastic. Alternatively or as a supplement, the transponder unit 12 may also be insulated, preferably thermally, from the vessel wall 14. Furthermore, it may be advantageous for the components of the processing unit 3 to be selected and/or disposed in a manner such that they are suitable for treatment in an autoclave.

The transponder unit 12 may thus be configured in a manner such that a specific coding can be stored, in particular on the data carrier, wherein the coding can be evaluated by the base station 2 as an identification signal to identify a specific processing unit 3. Furthermore, the respective operating period for the processing unit 3 can be stored on the data carrier and can be updated and/or logged at any time, in particular automatically.

Processing units 3 having several, in particular different tools 4 may be operated with the base station 2 of the device 1 in accordance with the invention (not shown in the figures).

In this regard, the base station 2 may be provided with a program memory with a plurality of processing programs, wherein the processing programs may respectively be assigned to a plurality of and/or to different processing units 3. Furthermore, the base station 2 may be configured in a manner such that, by means of a or the specific identification signal, a specific processing program, in particular authorized for the processing unit 3, can be selected from a or the program memory, preferably automatically. In this manner, for example, a processing time, in particular a maximum operating time for which the processing unit 3 is designed, and/or a specific processing intensity can be selected or defined.

The processing unit 3 may be provided with a retaining element 17 which is preferably configured as a handle so that the processing unit 3 can be easily and safely detached from and/or carried by the base station 2.

As an example, in order to manually set a processing program and/or to program the base station 2, this latter may be provided with at least one operating element 15 for operating the base station 2. Furthermore, the device 1, in particular the base station 2, may be provided with a display means 16. The current program and/or a warning, for example when a maximum operating time for a processing unit 3 has been reached, may be displayed for example using the display means 16. Furthermore, in one embodiment, this may be a touchscreen.

In order to make it easier to remove a medium processed by the device 1 in accordance with the invention from the vessel 5, in particular by pouring, the vessel 5 may be provided with a pouring spout 18, in particular a pouring spout 18, which is disposed at the upper edge of the vessel 5 and/or at the side opposite to the retaining element 17.

In addition, the device 1 in accordance with the invention is provided with a housing 22. In particular, the housing 22 may be at least partially produced from a plastic.

In order to supply the device 1 in accordance with the invention with power, it may be capable of being connected to a grid supply by means of a grid connection. Furthermore, the device 1 may be provided with a power switch 29 in order to isolate it from the power supply.

In order to ensure that the device 1 in accordance with the invention is stable, in particular at high rotational speeds and/or because the filling inside the vessel 5 is unbalanced, the device 1 may be provided with a plurality of feet 19 that in particular are anti-slip. Preferably, the device 1 is provided with rubberized feet 19.

LIST OF REFERENCE NUMERALS 1 device
2 base station
3 processing unit
4 tool
5 vessel
6 closure unit
7 wireless module
8 drive
9 coupling element
10 mating coupling element
11 receiving unit
12 transponder unit
13 sensor unit
14 vessel wall
15 operating element
16 display means
17 retaining element
18 pouring spout
19 foot
20 base
21 aperture
22 housing
23 vessel internal space
24 opening in vessel wall
25 vessel bottom
26 outside of vessel wall
27 sensor element
28 inside of vessel wall
29 power switch
30 filling opening

The invention claimed is:

1. A device (1) having a base station (2) and a plurality of processing units (3) that can be selectively attached and detached from the base station (2), each having a different tool (4) for processing a medium, wherein each of the processing units (3) is provided with a vessel (5) for receiving the medium, a closure unit (6) for closing the vessel (5) and a sensor device (13) for measuring at least one parameter of the medium, wherein, at least a portion of the sensor device (13) is provided with the vessel (5) in a stationary manner such that a measurement of a parameter can be carried out simultaneously with processing of the medium, and in that the device (1) has a wireless module (7) for producing a wireless connection and at least for transmitting data between the base station (2) and the processing units (3) when attached to the base station (2), wherein, each of the processing units (3) includes a transponder unit (12) having an associated memory, having stored thereon by coding, a specific identification signal so that the base station (2) can identify the respective processing unit (3) attached to the base station (2), wherein, the base station (2) includes a program memory having a plurality of processing programs assigned to each of the processing units (3) such that, in response to receipt of the specific identification signal, a specific processing program is automatically selected from the program memory to define at least one of a processing time and a processing intensity for the respective processing unit (3) attached to the base station (2), wherein, the base station is configured to automatically start the selected specific processing program, wherein, maximum operating periods are defined on the transponder units (12) of the processing units (3) which are readable by the base station (2), the base station (2) monitoring operation of the processing units (3) when attached to the base station (2) to determine when the respective maximum operating periods have elapsed, and, wherein, for each of the processing units (3), the associated memory of the transponder unit (12) is updatable to update the respective maximum operating period.

2. The device (1) as claimed in claim 1, wherein, the base station (2) includes a receiving unit (11), wherein an electronic coupling can be established between the transponder unit (12) of the processing unit (3) attached to the base station (2) and the receiving unit (11) for at least one of sending data from the receiving unit (11) to the transponder unit (12) and receiving data sent from the transponder unit (12) to the receiving unit (11).

3. The device (1) as claimed in claim 2, wherein, the receiving unit (11) is configured to supply energy to the transponder unit (12) of the respective processing unit (3) attached to the base station (2) by transmitting radio waves.

4. The device (1) as claimed in claim 2, wherein, the receiving unit (11) is disposed on a base (20) of the base station (2) used to position the respective processing unit (3) on the base station (2) when attached thereto.

5. The device (1) as claimed in claim 4, wherein, the receiving unit (11) is disposed in an aperture formed in a top of the base (20).

6. The device (1) as claimed in claim 2, wherein, the receiver unit (11) is configured as an RFID receiver.

7. The device (1) as claimed in claim 6, wherein, for each of the processing units (3), the transponder unit (12) is configured as an RFID transponder (12).

8. The device (1) as claimed in claim 1, wherein, for each of the processing units (3), the transponder unit (12) is disposed on an outer side (26) of the vessel of the respective processing unit (3).

9. The device (1) as claimed in claim 1, wherein, for each of the processing units (3), the sensor device (13) is electrically connected to the transponder unit (12) of the respective processing unit (3) to be configured together as a transponder-sensor unit.

10. The device (1) as claimed in claim 1, wherein, for each of the processing units (3), the transponder unit (12) is thermally insulated from at least a portion of the sensor device (13) of the respective processing unit (3).

11. The device (1) as claimed in claim 1, wherein, for each of the processing units (3), at least a portion of the sensor device (13) is coated.

12. The device (1) as claimed in claim 1, wherein, the base station (2) is provided with a drive (8) configured to drive the tool (4) of the respective processing unit (3) attached to the base station (2).

13. The device (1) as claimed in claim 1, wherein, for each of the processing units (3), the transponder unit (12) is configured as an RFID transponder (12).

14. The device (1) as claimed in claim 13, wherein, for each of the processing units (3), the transponder unit (12) includes a memory and an antenna.

15. The device (1) as claimed in claim 1, wherein, for each of the processing units (3), the sensor device (13) is provided with one or more sensors selected from the group consisting of: temperature sensor, pH sensor, moisture sensor and pressure sensor.

16. The device (1) as claimed in claim 1, wherein, each of the processing units (3) is configured as a unit selected from the group consisting of: blender unit, grinder unit, mixing unit and kneading unit.

17. The device (1) as claimed in claim 1, wherein, for each of the processing units (3), the sensor device (13) includes a sensor pin configured to contact the medium inside the vessel (5) of the respective processing unit (3).

18. The device (1) as claimed in claim 1, wherein, for each of the processing units (3), the sensor device (13) includes a sensor pin disposed in an internal space (23) of the vessel (5) of the respective processing unit (3).

19. The device (1) as claimed in claim 1, wherein, for each of the processing units (3), the sensor device (13) includes a sensor pin configured to pass through an opening in a wall of the vessel (5) to extend into an internal space (23) of the vessel (5) of the respective processing unit (3).

20. The device (1) as claimed in claim 1, wherein, for each of the processing units (3), the transponder unit (12) is enclosed by a layer of plastic.

* * * * *